(12) United States Patent
Ali et al.

(10) Patent No.: US 7,801,043 B2
(45) Date of Patent: Sep. 21, 2010

(54) METHOD AND APPARATUS FOR ADMISSION CONTROL AND RESOURCE TRACKING IN A WIRELESS COMMUNICATION SYSTEM

(75) Inventors: Ahmed Ali, Ottawa (CA); Angelo Cuffaro, Laval (CA)

(73) Assignee: InterDigital Technology Corporation, Wilmington, DE (US)

(*) Notice: Subject to any disclaimer, the term of this patent is extended or adjusted under 35 U.S.C. 154(b) by 519 days.

(21) Appl. No.: 11/393,304

(22) Filed: Mar. 29, 2006

(65) Prior Publication Data

US 2006/0268702 A1    Nov. 30, 2006

Related U.S. Application Data

(60) Provisional application No. 60/667,328, filed on Apr. 1, 2005.

(51) Int. Cl.
*H04J 1/16*      (2006.01)
*H04J 3/14*      (2006.01)

(52) U.S. Cl. .................. 370/235; 370/337; 370/347; 370/389; 370/412; 370/445; 455/450

(58) Field of Classification Search .............. 370/235, 370/337, 347, 389, 395.43, 411, 412, 445, 370/465; 455/450
See application file for complete search history.

(56) References Cited

U.S. PATENT DOCUMENTS 6,331,970 B1*  12/2001  Nieh et al. .................. 370/230
7,151,762 B1   12/2006  Ho et al.
7,328,026 B2*   2/2008  Gu et al. .................. 455/452.1

2002/0163933 A1   11/2002  Benveniste (Continued)

FOREIGN PATENT DOCUMENTS

JP    2004-214865    7/2004

(Continued)

OTHER PUBLICATIONS

IEEE Standard for Information technology—Telecommunications and information exchange between systems—Local and metropolitan area networks-Specific requirements.IEEE P802.11e/D13.0, Jan. 2005, (Amendment to ANSI/IEEE Std 802.11®-1999 (2003 Reaff) editionas amended by IEEE Std 802.11g-2003, (see IDS, Nov. 23, 2009), as provided by applicant.*

(Continued)

*Primary Examiner*—Dwayne D Bost
*Assistant Examiner*—Inder P Mehra
(74) *Attorney, Agent, or Firm*—Volpe and Koenig, P.C.

(57) ABSTRACT

A method and apparatus for admission control and resource tracking in a wireless communication system are disclosed. A wireless transmit/receive unit (WTRU) and a base station maintain parameters for admission control including parameters for the amount of time available for admission of traffic of each access category and for the amount of time available for admission of all access categories and parameters for admitted time and used time for the WTRU. Upon receipt of an admission request for a traffic stream from the WTRU, the base station determines whether to accept or deny the request based on the medium time for the requested traffic stream and the available time for the access category and total available time. The base station tracks the actually transmitted time by the WTRU, reclaims the unused time and returns the reclaimed time to either a common pool or to the WTRU as needed.

14 Claims, 3 Drawing Sheets

U.S. PATENT DOCUMENTS

| | | | |
|---|---|---|---|
| 2002/0199193 A1* | 12/2002 | Gogoi et al. | 725/46 |
| 2004/0038668 A1 | 2/2004 | Ho | |
| 2004/0170198 A1* | 9/2004 | Meggers et al. | 370/514 |
| 2004/0213150 A1 | 10/2004 | Krause et al. | |
| 2005/0049013 A1 | 3/2005 | Chang et al. | |
| 2005/0135318 A1 | 6/2005 | Walton et al. | |
| 2006/0045050 A1* | 3/2006 | Floros et al. | 370/332 |
| 2006/0153242 A1 | 7/2006 | Krause et al. | |
| 2006/0209768 A1* | 9/2006 | Yan et al. | 370/338 |
| 2006/0215686 A1* | 9/2006 | Takeuchi | 370/445 |
| 2007/0047570 A1 | 3/2007 | Benveniste | |

FOREIGN PATENT DOCUMENTS

| | | |
|---|---|---|
| TW | 496058 | 7/2002 |
| WO | 2004/004387 | 1/2004 |
| WO | 2005/027387 | 3/2005 |

OTHER PUBLICATIONS

IEEE Standard for Information technology—Telecommunications and information exchange between systems—Local and metropolitan area networks—Specific requirements, Part 11: Wireless LAN Medium Access Control (MAC) and Physical Layer (PHY) specifications: Amendment: Medium Access Control (MAC) Quality of Service (QoS) Enhancements, IEEE )802.11e D13.0 (Jan. 2005).

* cited by examiner

US 7,801,043 B2

METHOD AND APPARATUS FOR ADMISSION CONTROL AND RESOURCE TRACKING IN A WIRELESS COMMUNICATION SYSTEM

CROSS REFERENCE TO RELATED APPLICATION

This application claims the benefit of U.S. provisional application No. 60/667,328 filed Apr. 1, 2005, which is incorporated by reference as if fully set forth.

FIELD OF INVENTION

The present invention is related to a wireless communication system. More particularly, the present invention is related to a method and apparatus for admission control and resource tracking in a wireless communication system.

BACKGROUND

The IEEE 802.11e standard provides enhancements to the baseline IEEE 802.11 standard for the support of an admission control function at the quality of service (QoS) access point (QAP). These enhancements distinguish QoS enhanced stations (QSTAs) from non-QoS STAs (STAs), and also distinguish QAPs from non-QoS access points (APs).

The QAP is responsible for implementing scheduling and admission control but is not specified explicitly in the standard. The standard provides the mechanisms by which a QSTA can request admission of a traffic stream (TS) and the QAP can provide notice of the admission or rejection of the request.

The traffic specification (TSPEC) is the primary mechanism for communication of QoS parameters which provides the management link between higher layer QoS protocols and the IEEE 802.11e channel access functions. The TSPEC describes characteristics of traffic streams, such as data rate, packet size, delay, and service interval. TSPEC negotiation between peer medium access control (MAC) layers provides the mechanism for controlling admission, establishment, adjustment and removal of traffic streams.

QSTAs send TSPEC requests to the QAP in the form of add traffic stream (ADDTS) management action frames. The QSTA must request TSPEC for both upstream, (from QSTA to QAP), and downstream, (from QAP to QSTA), flows. The QAP evaluates if there are available resources to meet the requested TSPEC. The QAP can respond by offering the QSTA an alternate TSPEC, (perhaps with lower performance QoS parameters), or the QAP may deny the TSPEC request entirely.

Once a TSPEC has been established, the TSPEC may be used for data transfer, and the QAP will meet the TSPECs QoS parameters to the greatest extent possible. A TSPEC may be deleted by the QSTA or the QAP. The QAP may unilaterally delete a QSTA's TSPEC if there are changes in the channel condition reducing available bandwidth, or if higher-priority TSPECs are requesting admittance.

TSPECs are generally created and destroyed based on requests from higher-layer management entities. TSPECs are deleted when the application using the QoS service has completed. Finally, a TSPEC will time out if corresponding traffic does not take place within the timeout defined during the setup Traffic stream admission control is especially important since there is limited bandwidth available in the wireless medium. Bandwidth access must be controlled to avoid traffic congestion, which can lead to breaking established QoS and drastic degradation of overall throughput.

SUMMARY

The present invention is related to a method and apparatus for admission control and resource tracking in a wireless communication system. A wireless transmit/receive unit (WTRU) and a base station maintain parameters for admission control including parameters for the amount of time available for admission of traffic of each access category and for the amount of time available for admission of all access categories and parameters for admitted time and used time for the WTRU. Upon receipt of an admission request for a traffic stream from the WTRU, the base station determines whether to accept or deny the request based on the medium time for the requested traffic stream and the available time for the access category and total available time. The base station tracks the actually transmitted time by the WTRU, reclaims the unused time and returns the reclaimed time to either a common pool or to the WTRU as needed.

BRIEF DESCRIPTION OF THE DRAWINGS

A more detailed understanding of the invention may be had from the following description, given by way of example and to be understood in conjunction with the accompanying drawings wherein.

DETAILED DESCRIPTION OF THE PREFERRED EMBODIMENTS

Figure 1:
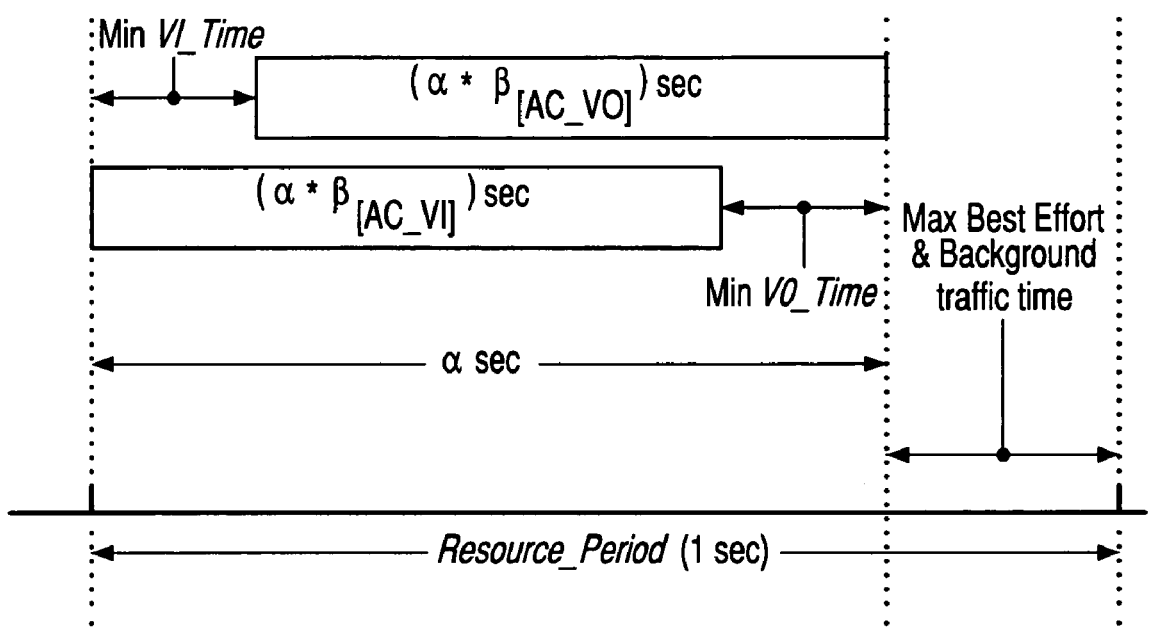
FIG. 1 describes how medium time is dynamically allocated and shared between higher priority services such as voice and video, and lower priority services categorized as best effort and background.

When referred to hereafter, the terminology "STA/QSTA" includes but is not limited to a user equipment (UE), a wireless transmit/receive unit (WTRU), a fixed or mobile subscriber unit, a pager, or any other type of device capable of operating in a wireless environment. When referred to hereafter, the terminology "AP/QAP" includes but is not limited to a Node-B, a base station, a site controller or any other type of interfacing device in a wireless environment.

The present invention provides a method to adapt to actual traffic demands rather than a pre-determined admission policy. Configuration parameters for admissible access categories can be adjusted dynamically to meet the operating conditions. In addition, the present invention employs a resource tracker feature that monitors the actual transmission time versus an allocated bandwidth and updates the system accordingly.

The present invention is applicable to any wireless communication system, such as a wireless local area network (WLAN) including, but not limited to, the IEEE 802.11e standard and the Wireless Multimedia Extensions (WME) version thereof.

The admission control algorithm is triggered upon request for the addition of a new traffic stream. The 802.11e standard requires specific procedures at the QAP and the QSTA for admission control support.

QAP Procedure.

If the QAP supports admission control, it uses admission control mandatory (ACM) flags advertised in the EDCA Parameter Set element to indicate whether admission control is enabled for each of the ACs (Access Categories). In the 802.11e standard, admission control is mandatory for voice (AC_VO) and video (AC_VI) access categories (ACs), where as Background (AC_BK) and Best Effort (AC_BE) access categories do not require admission control. In the 802.11e standard, ACs (Access Categories) are used to distinguish between high priority (i.e. voice and video) and lower priority services (i.e. best effort and background)

Upon reception of an ADDTS message from a QSTA, the QAP can decide to accept or reject the requests and informs the QSTA of it.

QSTA Procedures.

Each channel access function maintains two variables. The first of these is the Admitted_Time$_{QSTA}$, and the second is the Used_Time$_{QSTA}$. The Admitted_Time$_{QSTA}$ and Used_Time$_{QSTA}$ are set to zero at the time of association. The QSTA may subsequently decide to explicitly request admission amount for the AC, which is associated with the specific IEEE 802.1D priority.

In order to make such a request, a QSTA transmits a TSPEC element contained in an ADDTS request management frame or in a (re)association request with the following fields specified (i.e. non-zero): nominal medium access control (MAC) service data unit (MSDU) size; mean data rate; minimum physical layer (PHY) rate and surplus bandwidth allowance. The Medium_Time$_{ts}$ field is not used in the request frame and shall be set to zero.

On receipt of a TSPEC element contained in an ADDTS response frame indicating that the request has been accepted, the non-AP QSTA adds to the Admitted_Time$_{QSTA}$ variable for the specified channel access function the value contained in the Medium_Time$_{ts}$ field of that element.

The QSTA may choose to tear down the explicit request at any time. For the tear down of an explicit admission, the QSTA transmits a delete TS (DELTS) frame containing the TS identification (TSID) and direction, which specify the TSPEC to the QAP. If the QSTA sends or receives a DELTS frame, the QSTA subtracts the associated Medium_Time$_{ts}$ value from the Admitted_Time$_{QSTA}$ variable of the specified AC.

The QSTA updates the value of Used_Time$_{QSTA}$: after each successful or unsuccessful MPDU (re) transmission attempt: Used_Time$_{QSTA}$=Used_Time$_{QSTA}$+MPDUExchangeTime; at one second intervals: Used_Time$_{QSTA}$=max ((Used_Time$_{QSTA}$−Admitted_Time$_{QSTA}$), 0). The MPDUExchangeTime equals the time required to transmit the frame, or MPDU, plus one acknowledgement (ACK) frame plus one short inter-frame space (SIFS). At the end of every successfully received packet, an ACK packet is transmitted after waiting an SIFS interval. In general, inter-frame spaces (IFS) are used as part of a collision avoidance mechanism.

Before the transmission of every frame, the channel access function checks if the Used_Time$_{QSTA}$ reached or exceeded the Admitted_Time$_{QSTA}$ value. If this is the case, then the channel access function shall no longer transmit using the EDCA parameters for that AC, until a future interval where the Used_Time$_{QSTA}$ reaches zero again.

The standard provides the QSTA the choice to temporarily replace the EDCA parameters for that channel access function with those specified for the access categories AC_BE (Best Effort) or AC_BK (Background) in order to continue transmissions at a lower priority while requesting further transmission time for the ACM-enabled AC. This is provided that no admission control is required for those access categories.

FIG. 1 shows the relationship between α and β (defined below) and the admissible time available. The total admissible time available includes transmission time dedicated to higher priority services, (i.e., voice (AC_VO) and video traffic (AC_VI)), and to best effort and background services, such as e-mail or web browsing.

α is defined as the maximum transmission time available to both voice (AC_VO) and video (AC_VI) traffic. Assuming that the resource period is 1 sec, then 1-α defines the transmission time dedicated to best effort and background traffic.

β is defined as the portion of traffic dedicated to voice and video services (α) that can be allocated to one single high priority service. β is used to guarantee that the total medium allocated to voice and video traffic is not monopolized by only one service. For example, if β(AC_VI) is set to 0.8, then only 80% of the medium dedicated to both video and voice traffic (α) can be used by video traffic. The remaining 20% is reserved for voice services, and vice versa.

Min VO_Time and Min VI_Time are defined as the minimum time reserved for voice and video traffic respectively. These parameters are based on β as described above.

The QAP calculates two (2) parameters:

1) TxBudget[AC]: the amount of time available for admission of traffic of that AC; and 2) Total_TxBudget: the amount of time available for admission of both ACM-enabled ACs (AC_VO and AC_VI).

TxBudget[AC] and Total_TxBudget are defined to be:

$$TxBudget[AC](\sec)=TransmitLimit[AC]-Allocated\_Time[AC]; \qquad \text{Equation (1)}$$

$$Total\_TxBudget(\sec) = \alpha - \sum_{AC}^{AC\_VO, AC\_VI} Allocated\_Time[AC]; \qquad \text{Equation (2)}$$

where:

TransmitLimit [AC] is the maximum amount of time that may be allocated for transmissions of a specific AC per 1 second interval.

TransmitLimit $[AC]=\beta[AC]*\alpha$

β[AC] is a percentage of α and should be set such that at any point in time, the system is able to admit:

A minimum VO_Time (sec) medium time for access category AC_VO, and

A minimum VI_Time (sec) medium time for access category AC_VI.

The setting of β[AC_VO] affects the minimum medium time available for AC_VI, and vice versa. Allocated_Time [AC]: is the amount of time that has been granted admission so far for all traffic streams under this AC.

$$Allocated\_Time[AC] = \sum_{ts=1}^{n} Current\_Allocated\_Time\_per\_TS_{ts}[AC];$$

where n is the number of TSs admitted under category AC. Therefore, equations (1) and (2) could be expressed as:

$$TxBudget[AC] = \qquad \text{Equation (3)}$$
$$(\beta_{[AC]} * \alpha) - \sum_{ts=1}^{n} \text{Current\_Allocated\_Time\_per\_TS}_{ts}[AC];$$

and $$\text{Total\_TxBudget} = \qquad \text{Equation (4)}$$
$$\alpha - \sum_{AC}^{AC\_VO}_{AC\_VI} \sum_{ts=1}^{n} \text{Current\_Allocated\_Time\_per\_TS}_{ts}[AC].$$

When an ADDTS request is received from the QSTA, the QAP's admission control algorithm derives a Medium_Time$_{ts}$ for the requested TS transmissions of a specific AC. The Medium_Time$_{ts}$ value is based on the information conveyed in the TSPEC element of the ADDTS request, and is calculated as follows:

Medium_Time$_{ts}$=Surplus Bandwidth Allowance*PPS*MPDUExchangeTime;    Equation (5)

where Surplus Bandwidth Allowance specifies the excess allocation of time (and bandwidth) over and above the stated application rates required to transport an MSDU belonging to the traffic stream.

PPS (packet per second)=ceiling((Mean Data Rate/8)/Nominal MSDU Size); and

PDUExchangeTime=duration (Nominal MSDU Size, Minimum Transmitted PHY Rate)+SIFS+ACK duration, where duration( ) is the PLME-TXTIME primitive that returns the duration of a packet based on its payload size and the PHY data rate employed.

When the ADDTS request is bi-directional, the AP considers the request as a request for two separate traffic streams, one uplink and one downlink, each having the parameter settings conveyed in the TSPEC element of the ADDTS request. In accordance with the resource tracking process of the present invention, at the time of receiving the admission request, the QAP determines whether to accept or deny the admission request based on the Medium_Time$_{ts}$, the TxBudget[AC], Total_TxBudget as follows:

If the following conditions:

Medium_Time$_{ts}$<=TxBudget[AC]; and

Medium_Time$_{ts}$<=Total_TxBudget;

are satisfied, then the QAP ensures that it has the transmission time available to be allocated.

If the Medium_Time$_{ts}$ meets all the above criteria for admission, then the Allocated_Time [AC] (at the QAP) is updated as follows:

Allocated_Time[AC]=Allocated_Time[AC]+ Current_Allocated_Time_per_TS$_{ts}$[AC], where Current_Allocated_Time_per_TS$_{ts}$[AC] is the allocated time for this particular TSID, i.e.: Current_Allocated_Time_per_TS$_{ts}$[AC]=Medium_Time$_{ts}$.

Consequently, this update is reflected in both TxBudget [AC] and Total_TxBudget as shown in Equations (3) and (4) above.

Having made such a determination, the QAP transmits a TSPEC element to the requesting QSTA contained in an ADDTS response frame. If the QAP is accepting the request, the Medium_Time$_{ts}$ field is specified.

After admission, the QAP updates a record of admitted time per AC for each QSTA, as follows:

$$\text{Admitted\_Time\_per\_QSTA}[AC] = \sum_{\substack{ts=1 \\ QSTA\_j}}^{m} \text{Medium\_Time}_{ts}[AC];$$

where m is the number of traffic streams per QSTA under the same AC, j is the specific QSTA, and Medium_Time$_{ts}$ is the original allocated time to the traffic stream.

The QAP uses a policing mechanism similar to that used in QSTA in which it monitors its downlink transmissions and updates a variable Used_Time_per_QSTA.

After each successful or unsuccessful MPDU (re) transmission attempt:

Used_Time_per_QSTA[AC]=Used_Time_per_QSTA+MPDUExchangeTime.

At 1 second intervals:

Used_Time_per_QSTA[AC]=max((Used_Time_per_QSTA−Admitted_Time_per_QSTA[AC]), 0).

Before the transmission of every frame, the channel access function checks if the Used_Time_per_QSTA[AC] reached or exceeded the Admitted_Time_per_QSTA[AC]value. If it is the case, then the channel access function no longer transmits using the EDCA parameters for that AC, until a future interval where the Used_Time_per_QSTA[AC] reaches zero again.

The QAP may choose at any time to tear down an explicit admission by sending a management notification frame with the action code set to delete traffic stream (DELTS).

By considering both criteria, TxBudget[AC] and Total_TxBudget, the present invention ensures that the QAP does not admit more traffic streams (or transmission time) per AC than it can support, which would achieve fairness to the other ACM_enabled AC. The present invention also ensures that even when the first criterion is met, the total available time can still accommodate the requested Medium_Time$_{ts}$, which would ensure some fairness to the non ACM-enabled traffic (AC_BK and AC_BE) despite their lower priority in the system.

Below is an example showing what a QSTA could request for admitting a TS under an ACM-enabled access category, and the respective Medium_Time$_{ts}$ calculation by the QAP.

| | |
|---|---|
| Surplus Bandwidth Allowance: | 1.1 (10% extra) |
| Nominal MSDU Size: | 1000 bytes |
| Min. PHY Rate: | 1 Mbps |
| Mean Data Rate: | 200 Kbps |

$$PPS = \text{ceiling}((\text{Mean Data Rate}/8)/\text{Nominal } MSDU \text{ Size})$$
$$= \frac{200 \text{ kbps}/8}{1000 \text{ bytes}}$$
$$= 25 \, (s^{-1})$$

-continued $$MPDUExchangeTime = \text{duration (Nominal } MSDU \text{ Size, Minimum Transmitted } PHY \text{ Rate)} + SIFS + ACK$$

$$= \frac{1000 \text{ byte} \times 8}{1 \text{ Mbps}} + SIFS + ACK$$

$$= 0.008 + 10 \text{ }\mu\text{sec} + \left(\frac{24 \text{ byte} \times 8}{1 \text{ Mbps}}\right)$$

where duration( ) is the PLME-TXTIME primitive, as defined in the IEEE 802.11 standard, that returns the duration of a packet based on its payload size and the PHY data rate employed.

$$MPDUExchangeTime = 0.008202 \text{ sec}$$

$$\text{Medium\_Time}_{ts} = \text{Surplus Bandwidth Allowance} * PPS * MPDUExchangeTime$$

$$= 1.1 \times 25 \times 0.008202$$

$$= 0.2255 \text{ sec}$$

$$\text{Medium\_Time}_{ts} = 22.55 \text{ msec}$$

Hence the requested time is 22.55 msec for a single TS. If both TxBudget[AC] and Total_TxBudget are greater than 22.55 msec, then the TS is admitted. This 22.55 msec is part of the total transmission time available for the QSTA under the requested category.

In the present invention, delay-sensitive traffic and jitter-sensitive traffic such as voice and video, are admitted based on a combination of budgets that reflect the available resource for each type of traffic, and the total available resources within the system. The present invention provides a method to adapt to actual traffic demands, rather than worst case predictions made by the STAs and provides a method to monitor the actual transmission time used by the STAs versus the allocated bandwidth, (medium time requested by the STAs), and updates the system resources accordingly.

The calculation of the Medium_Timets at the QAP relies on the minimum PHY rate, (a worst case estimate). However, it is most likely that the QSTA would be transmitting at an average PHY rate higher than the minimum rate, which means the QSTA is requesting and is allocated a medium time that might be greater than what it actually needs. The unused transmission time can be returned back to the pool and be made available for future admission requests by the same or other TSs.

Figure 2:
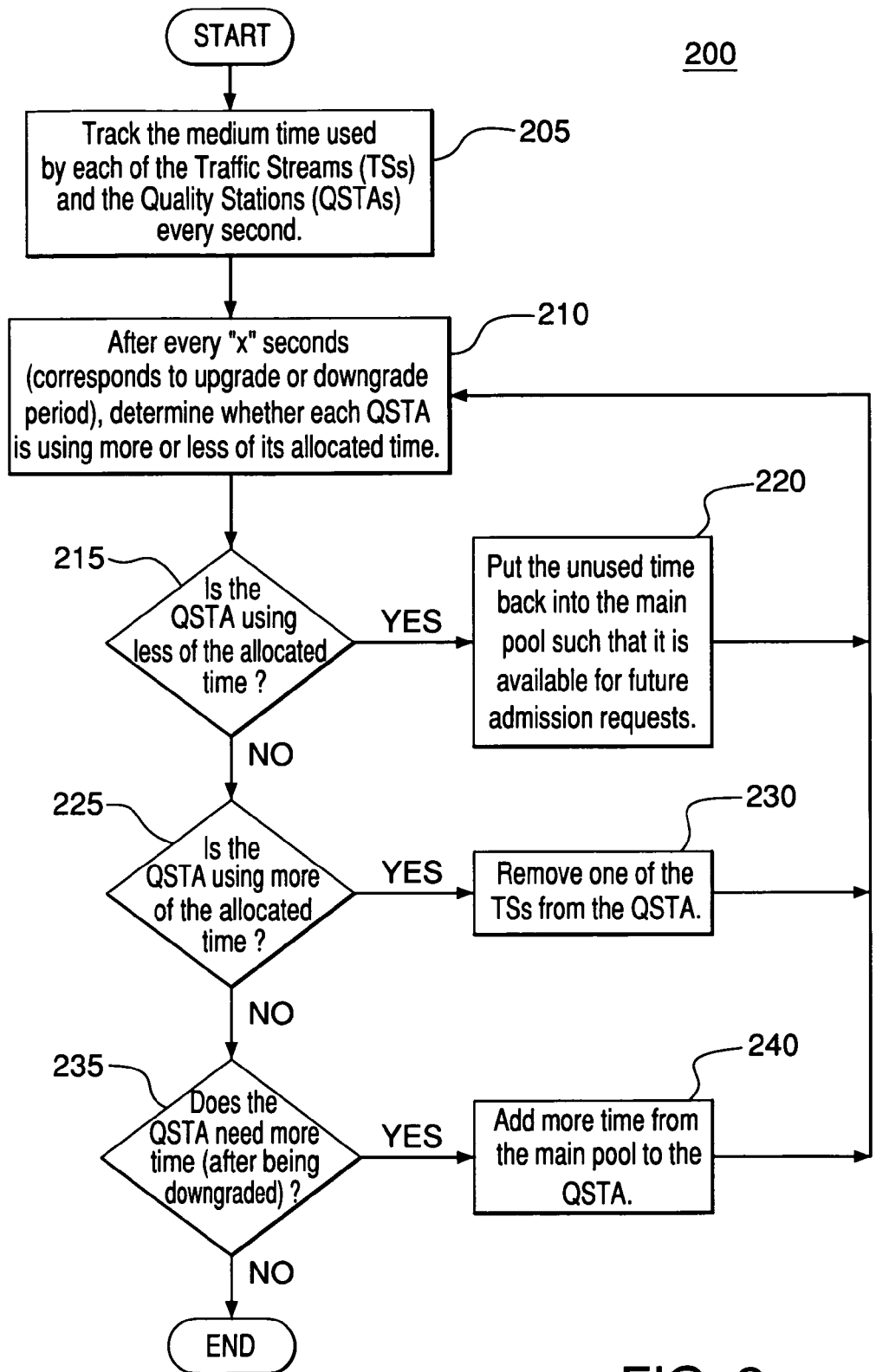
FIG. 2 is a flow diagram of a resource tracking process in accordance with the present invention.

FIG. 2 is a flow diagram of a general process 200 for resource tracking in accordance with the present invention. Once a traffic stream (TS) is approved for admission, the QAP tracks the amount of the time occupied by transmissions over each TS during a 1 second period (for ACM-enabled traffic only), including associated SIFS and ACK times if applicable, (depending in whether a Block Acknowledgment is being used or not) (step 205). In step 210, after every "x" seconds, (corresponding to an upgrade or downgrade period), a determination is made as to whether each QSTA is using more or less of its allocated time. If the QSTA is using less of the allocated time, as determined in step 215, the unused time is put back into the main pool such that it is available for future admission requests (step 220). If the QSTA is using more of the allocated time, as determined in step 225, one of the TSs is removed from the QSTA (step 230). If the QSTA needs more time, (after being downgraded), as determined in step 235, more time is added from the main pool to the QSTA (step 240).

For every TS, the QAP maintains a counter TxTime[ts]. During a 1 second interval, and for each data frame received by the QAP with the receiver address equal to the QAP MAC address, or transmitted by the QAP, and has a non-zero AC, the QAP adds to the TxTime[ts] counter corresponding to the TSID of that frame, a time equal to:

a) The time on-air of the frame, including the preamble and PHY header, if the acknowledgement policy is set to "no acknowledgement".

b) The time on-air of the frame, including the preamble and PHY header, plus the duration of the acknowledgement frame and SIFS time if the acknowledgement policy is set to "normal acknowledgement".

At the end of each 1 second interval, TxTime [ts] value is recorded in an array and then reset to zero for the following interval. For each QSTA, the TxTime [ts] for all traffic streams are combined under the same AC, known as Total_TxTime_per_QSTA[AC], which is recorded in an array. Then, the TxTime[ts] value is reset to zero for the following interval.

Downgrading Current_Allocated_Time_per_TSts:

After a period Downgrade_LT_PeriodAC (sec) (Downgrade Long Term transmission period), the QAP performs the following:

On an individual TS level:

The CDF of TxTime[ts] array is calculated. Then the $95^{th}$ percentile TxTime_Tracker_CDF is deduced. Any other percentile may be deduced, such as the $90^{th}$ percentile.

On an AC level per QSTA:

The CDF of Total_TxTime_per_QSTA[AC] array is calculated. Then the $95^{th}$ percentile Total_TxTime_Tracker_CDF is deduced. Any other percentile may be deduced, such as the $90^{th}$ percentile.

The current total allocated time per QSTA per AC, which is the sum of the most recent values of Current_Allocated_Time_per_TSts [AC] per QSTA, is compared to the actually used transmission time for these traffic streams, as follows:

$$\text{If} \sum_{\substack{ts=1 \\ QSTA\_J}}^{m} \text{Current\_Allocated\_Time\_per\_TS}_{ts}[AC] - \text{Total\_TxTime\_Tracker\_CDF} >= (+ve)\text{Margin};$$

Equation (6)

where Margin=Margin_Factor*Admitted_Time_per_QSTA [AC].

If the above condition is true either one or all of the traffic streams, (for this QSTA under this AC), are using less than they had requested, and the unused time could be returned back to the main pool and made available for future admission requests.

Referring to FIG. 2, the traffic streams for this QSTA which are not using their allocated time are determined in step 210. The traffic streams are sorted in descending order according to the positive differential between their current Current_Allocated_Time_per_TS$_{ts}$ [AC], and their actual transmission time TxTime_Tracker_CDF.

Differential=Current_Allocated_Time_per_$TS_{ts}$[AC]−
TxTime_Tracker_CDF  Equation (7)

Then the following calculations are made, for every TS with a positive Differential value, to determine the amount of time to be returned to the pool:

$$\text{Returned\_Time} = \min(\text{Differential}, \text{Total\_Differential} - \text{Total\_Returned\_Time}) \quad \text{Equation (8)}$$

where:

$$\text{Total\_Differential} = \sum_{ts=1}^{m} \text{Current\_Allocated\_Time\_per\_TS}_{ts}[AC] - \text{Total\_TxTime\_Tracker\_CDF}; \quad \text{Equation (9)}$$

and $$\text{Total\_Returned\_Time} = \text{Total\_Returned\_Time} + \text{Returned\_Time} \quad \text{Equation (10)}$$

It is noted that the maximum Total_Returned_Time must be less than or equal to the Total_Differential.

Returned_Time is only put back into the pool if there is a minimum reserve in the current values of Tx_Budget[AC] and the Total_TxBudget; respectively, as follows:

If Tx_Budget[AC]>=Min_Tx_Budget[AC] and Total_TxBudget>=Min_Total_TxBudget, then Current_Allocated_Time_per_TS$_{ts}$[AC]=Current_Allocated_Time_per_ITS$_{ts}$[AC]−Returned_Time.

The above two conditions ensure that at least in the case of one TS, the QAP would not take away unused (and originally allocated) transmission time unless it can return it back when it is needed.

This procedure is repeated until either all the TS have been processed or the Total_Returned_Time has reached the Total_Differential. If adding the Differential exceeds the Total_Differential, then the Returned_Time is adjusted such that the Total_Returned_Time is equal to the Total_Differential, and the adjusted Returned_Time is removed from the Current_Allocated_Time_per_TSts [AC].

The updated Current_Allocated_Time_per_TSts [AC] value is reflected in the Allocated_Time[AC] calculation, which effectively increases the pool of time available in both TxBudget [AC] and Total_TxBudget calculations as in Equations (3) and (4); respectively.

The value of Admitted_Time_per_QSTA[AC] is not changed and kept as it is, because it is used as a reference for comparing against the actual used transmission time.

The Downgrad_LT_PeriodAC period should be long enough to give a good picture of the average transmission time for the traffic stream concerned. If it is too short, then there is a risk that the QSTA would start transmitting more on this particular traffic stream while additional traffic streams have already been admitted based on the previously un-used time of this TS, consequently resulting in a congestion situation.

However, if the latter case had occurred despite choosing a long enough Downgrade_LT_PeriodAC, then a Congestion Control algorithm takes action.

Upgrading Current_Allocated_Time_per_TSts or Exceeding the original Medium_Timet:

After a period Upgrade_LT_PeriodAC (sec) (Upgrade Long Term transmission period), the QAP performs the following:

On an individual TS level:

The CDF of TxTime[ts] array is calculated, and the 50$^{th}$ percentile TxTime_Cong_CDF is deduced.

On an AC level per QSTA:

The CDF of Total_TxTime_per_QSTA[AC] array is calculated. Then, the 50$^{th}$ percentile Total_TxTime_Cong_CDF is deduced.

The current total allocated time per QSTA per AC, which is the sum of the most recent values of Current_Allocated_Time_per_TSts [AC] per QSTA, is compared to the actually used transmission time for these traffic streams.

If after an Upgrade_LT_PeriodAC period the QAP finds that a QSTA has exceeded its currently allocated time (the left hand side in Equation (10) is negative) then the Current_Allocated_Time_per_TSts[AC] may be restored back (by increments equal to the excess in the time being detected) and up to the original Medium_Timets value (per TS) upon admission. The following check is performed to determine whether the QSTA has exceeded its allocated time:

$$\sum_{ts=1}^{m} \text{Current\_Allocated\_Time\_per\_TS}_{ts}[AC] - \text{Total\_TxTime\_Cong\_CDF} <= (-ve) \text{Margin} \quad \text{Equation (11)}$$

where Margin=Margin_Factor*Admitted_Time_per_QSTA [AC].

The Margin is used to prevent too frequent upgrading and downgrading of the Current_Allocated_Time_per_TSts [AC].

If the above condition is true, then the algorithm next determines which TSs are exceeding their currently allocated transmission times. The traffic streams are sorted in the ascending order according to the negative differential (the least negative at the top of the list) between Current_Allocated_Time_per_TS$_{ts}$[AC] and the 50$^{th}$ percentile transmission time TxTime_Cong_CDF.

A check is made, for every TS with a negative differential value, the amount of time to be taken back from the pool is:

$$\text{Required\_Time} = \min(\text{abs}(\text{Differential}), \text{Total\_Differential} - \text{Total\_Required\_Time}); \quad \text{Equation (12)}$$

where Differential=Current_Allocated_Time_per_TS$_{ts}$[AC]−TxTime_Cong_CDF, and Total_Differential and Total_Required_Time are expressed as:

$$\text{Total\_Differential} = \text{abs}\left(\sum_{ts=1}^{m} \text{Current\_Allocated\_Time\_per\_TS}_{ts}[AC] - \text{Total\_TxTime\_Cong\_CDF}\right); \quad \text{Equation (13)}$$

$$\text{Total\_Required\_Time} = \text{Total\_Required\_Time} + \text{Required\_Time}$$

It is noted that the maximum Total_Required_Time must be less than or equal to Total_Differential.

Then, for each traffic stream, the Required_Time is restored only if the conditions below are satisfied:

If Required Time<=TxBudget[AC] and Required_Time<=Total_TxBudget, then Current_Allocated_Time_per_TS$_{ts}$[AC]=Current_Allocated_Time_per_TS$_{ts}$[AC]+Required_Time.

If a traffic stream with a negative differential fails the two conditions above, then it is deleted, and the QSTA is notified by sending a management notification frame with the action code set to DELTS. It should be noted that the sorting order was chosen such that in the case where there are limited resources, the available resources is shared among as many traffic streams as possible, rather than using all the resources for one excessively exceeding user.

This procedure is repeated until either all the TSs have been processed or the Total_Required_Time has reached the Total_Differential. If adding the differential exceeds the Total_Differential, then the Required_Time is adjusted such that the Total_Required_Time is equal to the Total_Differential, and the adjusted Required_Time is added to the Current_Allocated_Time_per_TSts [AC].

The resource tracking and updating procedure in accordance with the present invention adds the benefit of reflecting the actual used and remaining resources (transmission time), which eventually allows better decisions when considering an admission request in the future by another traffic stream.

The significant parameters used by the present invention are summarized below:

TABLE 1

Inputs for Contention-based Admission Control

| Symbol | Description | Type | Default Value | Range |
|---|---|---|---|---|
| Minimum PHY Rate | The minimum PHY rate (bps) | Config. parameter | 1 Mbps | NA |
| Nominal MSDU Size | MSDU size for this traffic stream (bytes) | Received parameter | Application Dependant | NA |
| Mean Data Rate | Average data rate (bps) | Received parameter | Application Dependant | NA |
| Surplus Bandwidth Allowance | Excess allocation of time (and bandwidth) over and above the stated application rate requirements | Received parameter | Application Dependant | 1.10~1.50 |
| α (sec) | The maximum transmission time available to voice (AC_VO) and video (AC_VI) traffic. | Config. parameter | 0.8 sec | 0.5~0.9 |
| $\beta_{[AC\_VO]}$ | The percentage amount of admissible time (fraction of α) that AC_VO can be allocated for transmission | Config. parameter | 80% | 0~100% |
| $\beta_{[AC\_VI]}$ | The percentage amount of admissible time (fraction of α) that AC_VI can be allocated for transmission | Config. parameter | 80% | 0~100% |
| VO_Time | Minimum medium time for access category AC_VO | Config parameter | $\alpha * (1 - \beta_{[AC\_VI]})$ | $0 \sim \alpha * \beta_{[AC\_VI]}$ |
| VI_Time | Minimum medium time for access category AC_VI | Config parameter | $\alpha * (1 - \beta_{[AC\_VO]})$ | $0 \sim \alpha * \beta_{[AC\_VO]}$ |
| Resource_Period | The time period over which all the time allocations are considered | Config parameter | 1 sec | NA |
| TxTime_Tracker_CDF | The CDF percentile used for upgrading/downgrading allocated transmission time | Config parameter | The 95$^{th}$ percentile value | NA |
| TxTime_Cong_CDF | The CDF percentile used for policing actual transmission time | Config parameter | The 50$^{th}$ percentile value | NA |
| TxTime$_{ts}$ | On-air transmission time for a certain traffic stream | Measurement parameter | NA | 0~1 |

TABLE 1-continued

Inputs for Contention-based Admission Control

| Symbol | Description | Type | Default Value | Range |
| --- | --- | --- | --- | --- |
| Avg_TxTime$_{ts}$ | Average on-air transmission time for a certain traffic stream over a LT_Period$_{AC}$ period | Measurement parameter | NA | 0~1 |
| Upgrade_LT_Period$_{AC}$ | Long Term transmission averaging period (sec) for upgrading | Config parameter | Access Category dependant | 5~600 (sec) |
| Downgrade_LT_Period$_{AC}$ | Long Term transmission averaging period (sec) for downgrading | Config parameter | Access Category dependant | 30~600 (sec) |
| Min_Tx_Budget [AC] | Minimum reserve that must be available in Tx_Budget | Config parameter | 0 | 0~Tx_Budget [AC] at 1 Mbps |
| Min_Total_Tx Budget | Minimum reserve that must be available in Total_Tx_Budget | Config parameter | 0 | 0~Min_Tx_Budget [AC] |
| Margin_Factor | Fraction of Medium_Time used as a margin for upgrading or downgrading transmission time | Config parameter | 0.2 | 0.1~0.4 |

Table 2 is an output for contention-based admission control in accordance with the present invention.

TABLE 2

Outputs for Contention-based Admission Control

| Parameters | Description |
| --- | --- |
| Medium_Time$_{ts}$ | Transmission time available for a certain traffic stream |

Figure 3:
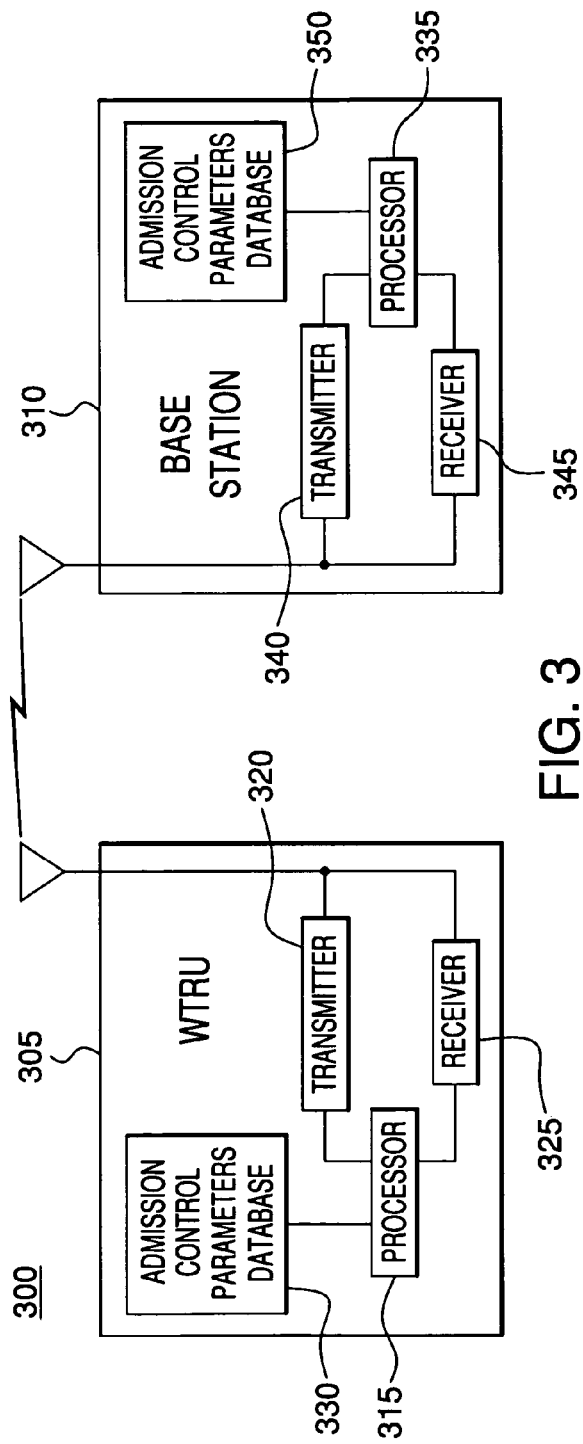
FIG. 3 is a block diagram of a wireless communication system in which the present invention is implemented.

FIG. 3 is a block diagram of a wireless communication system 300 in which the present invention is implemented. The system 300 includes a WTRU 305 and a base station 310. The WTRU 305 includes a processor 315, a transmitter 320, a receiver 325 and an admission control parameters database 330. The base station 310 includes a processor 335, a transmitter 340, a receiver 345 and an admission control parameters database 350.

In the WTRU 305, the admission control parameters database 330 maintains parameters for admission control including parameters for admitted time and used time for the WTRU. The transmitter 320 transmits an admission request for a traffic stream associated with a particular access category. The WTRU 305 explicitly requests an admission amount for the access category in the admission request In the base station 310, the admission control parameters database maintains parameters for admission control including parameters for an amount of time available for admission of traffic of each access category and for an amount of time available for admission of all access categories. The receiver 345 receives the admission request from the WTRU. The processor 335 determines whether to accept or deny the request based on a medium time for the requested traffic stream, the available time for the access category and total available time. The processor 335 admits the request and updates the available time parameters if the medium time is less than the available time for the access category and the total available time. Otherwise, the processor 335 rejects the request. A response to the request which indicates whether the request is admitted or rejected is transmitted by the transmitter 345 of the base station 310 to the receiver 325 of the WTRU 305.

The processor 315 in the WTRU 305 adds the medium time for the traffic stream to the admitted time when the receiver 325 in the WTRU 305 receives a response indicating that the request is accepted. The processor 315 updates the used time each time the transmitter 320 in the WTRU 305 transmits data packets. The processor in the WTRU 305 determines each time the WTRU 305 transmits data packets whether the used time is less than the admitted time, whereby the transmitter 320 in the WTRU 305 transmits data packets only if the used time is less than the admitted time for the WTRU 305. The used time is reset every one second interval.

The base station 310 reserves minimum available time for each access category. The processor 335 in the base station 310 tracks the actually transmitted time by the WTRU 305 and compares the actually transmitted time and the admitted time for the WTRU 305. The unused time is returned to a common pool. The tracking is performed for each traffic stream. The unused time is returned only if the base station 310 has a minimum available time for the access category. The processor 335 in the base station 310 determines whether actually transmitted time by the WTRU 305 exceeds a currently allocated time for the WTRU 305. The unused time is returned to the WTRU 305 if the actually transmitted time by the WTRU 305 exceeds a currently allocated time for the WTRU 305.

Figure 4:
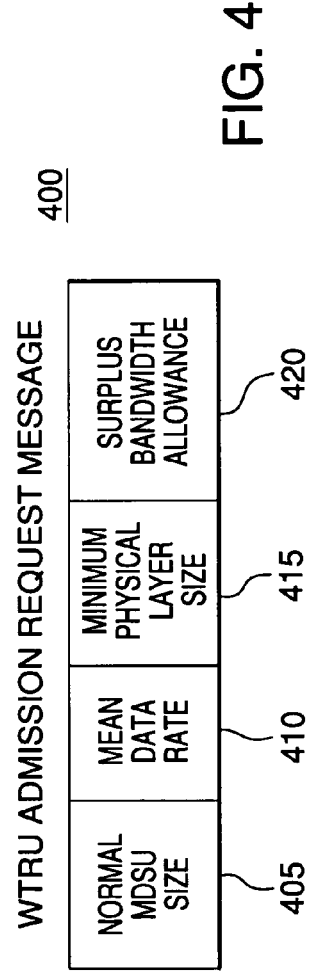
FIG. 4 shows a WTRU admission request message configured in accordance with the present invention.

FIG. 4 shows a WTRU admission request message 400 configured in accordance with the present invention. The WTRU admission request message 400 includes a nominal medium access control (MAC) service data unit (MSDU) size field 405, a mean data rate field 410, a minimum physical layer (PHY) rate field 415 and a surplus bandwidth allowance field 420.

Although the features and elements of the present invention are described in the preferred embodiments in particular combinations, each feature or element can be used alone without the other features and elements of the preferred embodiments or in various combinations with or without other features and elements of the present invention.

What is claimed is:

1. A method for admission control comprising:
a base station maintaining parameters for admission control in an admission control parameters database, wherein the base station parameters include an available time parameter for each of a plurality of access categories and a total available time parameter for all access categories;
the base station receiving an admission request for a traffic stream associated with an access category;
the base station determining whether to accept or deny the admission request based on a requested medium time for the requested traffic stream, a maximum time allocated for the access category associated with the admission request, wherein a minimum time is reserved and available for each ACM enabled access category, a currently allocated time for the access category associated with the admission request, and a maximum available time reserved for all ACM enabled access categories that does not include a medium time which is reserved for non-ACM enabled access categories;
wherein the base station accepts the admission request on a condition that the requested medium time is less than or equal to a difference between a maximum available time allocated and currently allocated time for the access category associated with the admission request and less than or equal to a difference between the maximum available time reserved for all ACM enabled access categories and a sum of the currently allocated medium time access across all ACM enabled access categories, otherwise the base station denies the admission request; and
on a condition that the admission request is accepted, updating the available time parameter for the access category associated with the admission request, the actual used time per traffic stream, the currently allocated time per traffic stream, and the total available time parameter across all ACM enabled access categories.

2. The method of claim 1, further comprising:
defining an admission control parameter a for a maximum transmission time available to the ACM enabled access categories such as both voice and video traffic;
defining an admission control parameter $\beta[vo]$ as a portion of the admission control parameter $\alpha$, where the admission control parameter $\beta[vo]$ is defined such that a minimum medium time for a voice access category is allocated for transmission all traffic streams within the access category; and
defining an admission control parameter $\beta[vi]$ as a portion admission control parameter $\alpha$, where the admission control parameter $\beta[vi]$ is defined such that a minimum medium time for a video access category is allocated for transmission all traffic streams within the access category.

3. The method of claim 1, wherein the base station parameters further include at least one of the following: an actual used time per traffic stream, a minimum reserved time for admission control mandatory (ACM) enabled access categories, a reserved time for non-ACM enabled access categories, a maximum transmission time available to the ACM enabled access categories, a resource period over which all time allocations are considered, upgrade and downgrade time periods, thresholds for upgrading or downgrading the traffic stream, or a currently allocated time per traffic stream.

4. A base station comprising:
an admission control parameters database configured to maintain parameters for admission control including an available time parameter for each of a plurality of access categories and a total available time parameter for all access categories;
a receiver configured to receive admission requests for a traffic stream associated with an access category;
a processor configured to determine whether to accept or deny an admission request based on a requested medium time for the requested traffic stream, a maximum time allocated for the access category associated with the admission request that is configured such that a minimum time is reserved and available for each ACM enabled access category, a currently allocated time for the access category associated with the admission request, and a maximum available time reserved for all ACM enabled access categories that does not include a medium time which is reserved for non-ACM enabled access categories;
wherein the processor accepts the admission request on a condition that the requested medium time is less than or equal to the difference between a maximum available time allocated and currently allocated time for the access category associated with the admission request and less than or equal to the difference between a maximum available time reserved for all ACM enabled access categories and a sum of the currently allocated medium time across all ACM enabled access categories, and otherwise denies the request; and
the processor further configured to update the available time parameter for the access category associated with the admission request, the actual used time per traffic stream, the currently allocated time per traffic stream, and the total available time parameter across all ACM enabled access categories, on a condition that the admission request is accepted.

5. The base station of claim 4 wherein the receiver is configured to receive admission requests that include a nominal medium access control (MAC) service data unit (MSDU) size, a mean data rate, a minimum physical layer (PHY) rate and a surplus bandwidth allowance.

6. The base station of claim 4 wherein the processor and the admission control parameters data base are configured to track an actual transmission time of a traffic stream of a wireless transmit/receive unit (WTRU) for which an admission request has been accepted and to compare the actual transmission time and an admitted time provided to the WTRU in connection with the accepted admission request to determine an amount of unused time for updating admission control parameters.

7. The base station of claim 6, wherein differential time is a difference between a statistical representation of the actual used time for the TSs of the WTRU and the currently allocated time for the traffic streams of the WTRU less a margin; and
on a condition that at least one or more traffic streams of the WTRU are not fully using allocated time, the processor is further configured to sort the traffic streams in descending order based on a positive differential between current allocated time and actual transmission time for each traffic stream.

8. The base station of claim 7, further comprising:

the processor further configured to return time to the available time parameter for the access category and the available time parameter for all ACM enabled access categories for each traffic stream with the positive differential, on a condition that a minimum time is reserved for each access category and a minimum is reserved time for all ACM enabled access categories and on a condition that the returned time is a minimum value between the differential and the difference between a total differential and a total returned time.

9. The base station of 8, wherein the available time parameter for the access category associated to the traffic stream and the total available time parameter for all ACM enabled access categories are updated after a downgrade period completes.

10. The base station of 9 further comprising:

the processor further configured to determine the traffic streams of the WTRU exceeding allocated time; and the processor further configured to sort the traffic streams in ascending order based on the negative differential between current allocated time and a statistical representation of the actual transmission time.

11. The base station of claim 10, further comprising:

the processor further configured to determine a required time to be taken from the pool for each traffic stream with the negative differential, wherein the required time is a minimum value between the absolute value of the differential and the difference between a total differential and a total required time; and on a condition that required time is less than or equal to the available time parameter for the AC associated to the traffic stream and the required time is less than or equal to the available time parameter for all ACM enabled access categories the required time is removed from the pool and added to the currently allocated time for the traffic stream, otherwise the further processor is configured to delete the traffic stream by sending a management notification frame to the WTRU.

12. The claim of 11, wherein the available time parameter for the access category associated to the traffic stream and the total available time parameter for all ACM enabled access categories are updated after the upgrade period completes.

13. The base station of claim 4, wherein the processor is configured to define an admission control parameter $\alpha$ for a maximum transmission time available to both voice and video traffic; define an admission control parameter $\beta[vo]$ as a portion admission control parameter $\alpha$, where the admission control parameter $\beta[vo]$ is defined such that a minimum medium time for a voice access category is allocated for transmission all traffic streams within the access category and define an admission control parameter $\beta[vi]$ as a portion admission control parameter $\alpha$, where the admission control parameter $\beta[vi]$ is defined such that a minimum medium time for a video access category is allocated for transmission all traffic streams within the access category.

14. The base station of claim 4, wherein the base station parameters further include at least one of the following: an actual used time per traffic stream, a minimum reserved time for admission control mandatory (ACM) enabled access categories, a reserved time for non-ACM enabled access categories, a maximum transmission time available to the ACM enabled categories, a resource period over which all time allocations are considered, upgrade and downgrade time periods, thresholds for upgrading or downgrading the traffic stream, or a currently allocated time per traffic stream.

* * * * *

UNITED STATES PATENT AND TRADEMARK OFFICE
CERTIFICATE OF CORRECTION

| | | |
|---|---|---|
| PATENT NO. | : 7,801,043 B2 | Page 1 of 1 |
| APPLICATION NO. | : 11/393304 | |
| DATED | : September 21, 2010 | |
| INVENTOR(S) | : Ali et al. | |

It is certified that error appears in the above-identified patent and that said Letters Patent is hereby corrected as shown below:

At claim 2, column 15, line 49 after the word "parameter", delete "a" and insert therefor --α--.

Signed and Sealed this
Twelfth Day of April, 2011

David J. Kappos
*Director of the United States Patent and Trademark Office*